Sept. 9, 1958

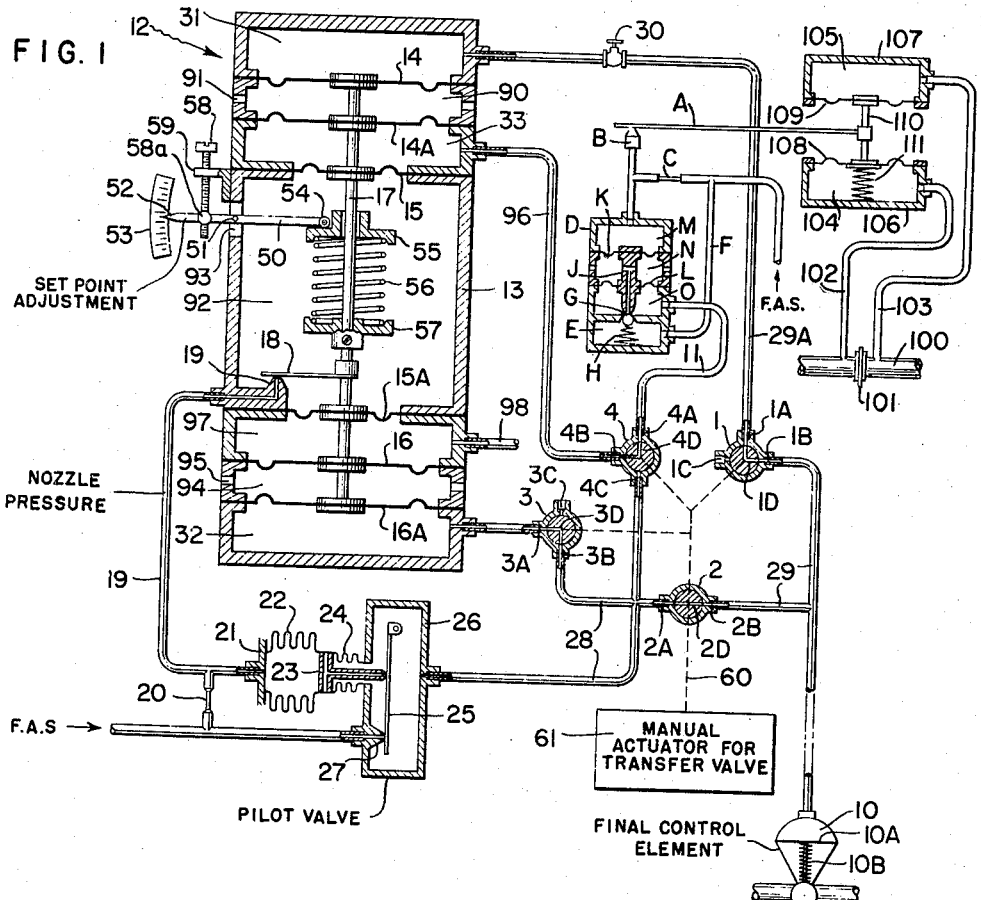

H. E. ELLER 2,851,047

CONTROLLER

Filed Feb. 14, 1955

INVENTOR
HAROLD E. ELLER
BY
ATTORNEY.

United States Patent Office 2,851,047
Patented Sept. 9, 1958

2,851,047
CONTROLLER

Harold E. Eller, El Paso, Tex., assignor to Minneapolis-Honeywell Regulator Company, Minneapolis, Minn., a corporation of Delaware Application February 14, 1955, Serial No. 488,016

8 Claims. (Cl. 137—82)

Air-powered apparatus for operating industrial processes is well known. Such apparatus includes: an air-operated final control valve, which governs the supply of fuel or other control agent to the process; a pilot valve or relay, which governs the air pressure applied to the final control valve; a manually operable means for actuating this relay and consequently this final control valve; and an automatically operable means for actuating this relay and consequently this final control valve. This manually operable means includes a handle mechanically connected to a spring and manually operable to vary the force exerted by this spring and an air-operated motor responsive to the air pressure put out by the pilot valve or relay and applied to the final control valve. This motor is mechanically connected to the spring and opposes the force exerted by the spring and consequently is operable to counterbalance the force applied by the spring to the pilot valve or relay. This automatically operable means includes a measuring instrument which is responsive to the controlled variable of the process and which actuates the pilot valve or relay and consequently the final control valve automatically in response to the variations in this controlled variable.

It is an object of this invention to provide manually operable means for actuating the final control valve, which means include: a manually operable handle, a spring whose output force is varied by this handle, and an air-operated motor mechanically connected to oppose the output force of the spring. This manually operable means employs the pilot valve or relay which also forms part of the automatically operable means. The spring, which forms part of the manually operable means, also forms part of the automatically operable means since this spring adjusts the set point. Therefore, both manual and automatic operation of the final control valve can be had by the use of a minimum number of parts.

It is a further object of this invention to provide an air-pressure-operated apparatus which may be automatically or manually actuated and which has an air-operated motor comprising a single chamber having a movable wall. To this chamber the automatically variable pressure is fed when the apparatus is in automatic position so that the automatically variable pressure exercises control over the final control element. In manual position, the manually variable pressure, which exercises control over the final control element, is also fed back to this same chamber. Thus, the pressure, which is applied to the final control element now, and the pressure, which will be applied to the final control element next, are maintained the same. Therefore, governance of the final control element can be switched from manual to automatic or vice versa without upsetting the process under control.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a diagrammatic or schematic view showing the elements of the apparatus connected together in an air-conducting circuit;

Fig. 2 is a table showing the positions of the transfer valves of Fig. 1; and

*Fig. 1*

Figure 3:
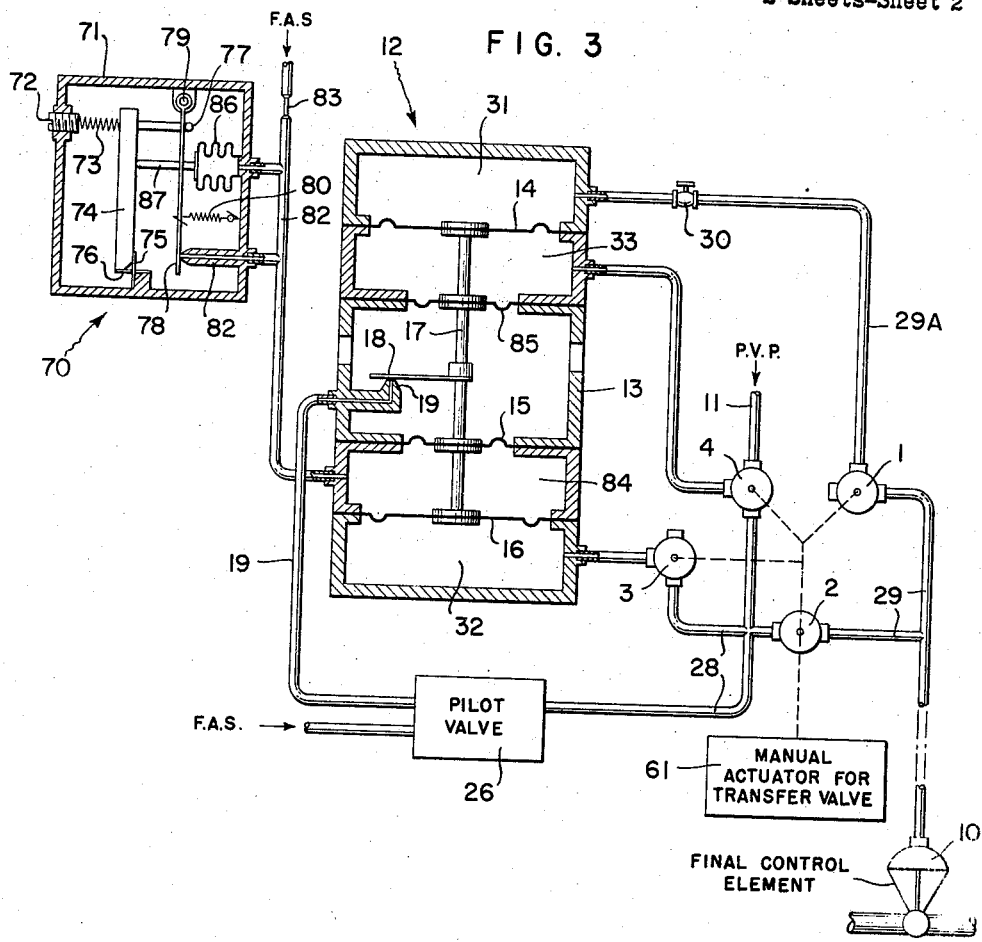
Fig. 3 is a diagrammatic or schematic view showing the elements of a modified apparatus connected together in an air-conducting circuit.

Fig. 1 shows a final control element, which is usually a valve controlling a fluid, which fluid influences the process under control. For example, the final control element may be a valve controlling the flow of fuel to a burner or furnace. Such a final control element is provided with an air-operated motor 10, usually in the form of a diaphragm 10A to one face of which a variable air pressure is applied and to the opposite face of which a spring 10B applies a biasing force. In this final control valve, preferably, an increase in air pressure causes the valve to open.

This final control valve may be actuated either automatically or manually.

The means for actuating the final control valve automatically comprise a measuring element responsive to a variable of the process under control and means for converting the variations sensed by this measuring instrument into a variable air pressure. There are a great number of such measuring instruments and such means commercially available. An example of such a measuring instrument is illustrated in Fig. 1 as a means for measuring a flow of fluid. The means for converting this flow of fluid into an air pressure are also illustrated.

Such a measuring instrument comprises a pipe 100 having a plate 101 extending across it. Plate 101 has a hole through it of less diameter than the internal diameter of pipe 100. When fluid flows through such a pipe and such an orifice, a high pressure is created on the on-coming or up-stream side of the plate and a low pressure on the off-going or down-stream side of the plate. These pressures are transmitted by pipes 102 and 103 to chambers 104 and 105, respectively. Chambers 104 and 105 are located in rigid housings 106 and 107, respectively, and have flexible diaphragms 108 and 109, respectively, as walls thereof. Diaphragms 108 and 109 are connected at their centers to a rod 110 on which is mounted a flapper A. A spring 111 biases rod 110 against the pressure of the fluid in chamber 105.

The means for converting the flow of fluid into an air pressure may comprise simply flapper A which is mounted for movement in response to the measuring instrument so as to close off a perforated nozzle B, completely or to leave nozzle B uncovered, thereby permitting a maximum flow of air through it. This air is supplied from a source of filtered, compressed air F. A. S. through a restriction C. The nozzle B may be connected directly to pipe 11.

However, as illustrated, it is generally preferred to amplify the changes in the pressure of the air in nozzle B by means of a pilot valve or relay.

Such a pilot valve or relay comprises a rigid case D having an inlet chamber E to which air is supplied from the source F. A. S. by pipe F. Chamber E contains an inlet ball valve G biased to closed position by spring H. An exhaust valve is comprised of valve stem J movable mounted in case D by means of flexible diaphragms K and L which divide the interior of case D into motor chamber M, exhaust chamber N, and output chamber O to which pipe 11 is connected.

Fig. 1 shows a conduit 11 to which a variable air pressure is supplied from such a measuring element and such means. Conduit 11 contains a valve, generally indicated at 4, and having a stationary casing through which three ports 4A, 4B, and 4C extend. In this casing is mounted a movable valve plug having an L-shaped perforation 4D passing therethrough. This L-shaped perforation 4D is adapted to connect port 4B to port 4A or to connect port 4B to port 4C and to disconnect the ports 4A or 4C which are not connected to port 4B.

A controller, generally indicated at 12, comprises a rigid casing 13 divided into six compartments by flexible diaphragms 14, 14A, 15, 15A, 16, and 16A. Diaphragms 14, 14A, 15, 15A, 16, and 16A are fixed to casing 13 at their perimeters and are connected together at their central movable portions to a shaft 17.

Between diaphragms 14 and 14A is a chamber 90 vented to atmosphere by vent 91. Between diaphragms 15 and 15A is a chamber 92 vented to atmosphere by vent 93. Between diaphragms 16 and 16A is a chamber 94 vented to atmosphere by vent 95. Chambers 90, 92, and 94 thus isolate the diaphragms which form their walls from each other except as the diaphragms are connected by shaft 17.

Shaft 17 carries on it a small valve or flapper 18, which cooperates with a stationary nozzle 19. Nozzle 19 controls a pilot valve or relay connected to a filtered air supply F. A. S. A restriction 20 applies air from source F. A. S. to nozzle pipe 19. Nozzle pipe 19 also connects through a stationary wall 21 to a bellows 22, which has a perforated, T-shaped, exhaust valve 23 secured to its free end. A sealing bellows 24, which is smaller than bellows 22, surrounds the horizontal arm or stem of the T-shaped exhaust valve 23. This arm or stem engages at its end with a flapper 25 pivotally mounted in a casing 26. Flapper 25 bears at its free or movable end against the end of an inlet port 27 directly connected to supply F. A. S. The output of this pilot valve or relay is formed by pipe 28, which connects to the following stationary valve ports: 2A; 3B; and 4C.

A valve, generally indicated at 2, is connected between pipe 28 and pipe 29 which communicates with the motor 10 for the final control element. Valve 2 has a stationary casing through which stationary valve ports 2A and 2B pass. In this stationary valve casing is mounted a movable valve plug having a passage 2D through it.

Pipe 29 also connects to port 1B in the wall of valve 1. The stationary wall of valve 1 also contains ports 1A and 1C. Mounted in the stationary casing of valve 1 is a movable valve plug containing an L-shaped passage 1D through it.

From valve port 1A a pipe 29A extends through a reset restriction, which may be formed either by a fixed restriction of capillary size or by an extremely small, adjustable restriction. The opposite side of restriction 30 is connected to a chamber 31 within valve casing 13. Chamber 31 has a flexible diaphragm 14 as a wall thereof.

Pipe 28 also connects to port 3B of valve 3, which has a stationary valve casing through which stationary valve ports 3A, 3B, and 3C pass. In this stationary valve casing is mounted a movable valve plug through which an L-shaped perforation 3D extends.

Valve port 3A is connected to a chamber 32 within the stationary casing 13 and of which diaphragm 16A forms a movable wall.

Stationary valve port 4B is connected by pipe 96 to a chamber 33 within the stationary casing 13 and having diaphragms 14A and 15 as movable walls thereof. Since diaphragm 15 is much smaller than diaphragm 14A and is, in fact, merely a seal, the pressure in chamber 33 tends to move shaft 17 upward, as seen in Fig. 1, or in the direction opposite to that in which spring 56 tends to move shaft 17. Therefore, flapper 18 will increase the flow of air through nozzle 19 and thereby reduce the pressure within bellows 22. This causes exhaust valve 23 to lift off flapper 25 and thereby open exhaust valve 23 to allow air to escape from the chamber within casing 26. Conversely, if shaft 17 had moved in the opposite direction, exhaust valve 23 would be moved toward flapper 25 and would permit the introduction of air to the chamber within the casing 26 from inlet port 27 and consequently an increase in the pressure therein.

The manually operable means for actuating the final control element comprise a lever 50 which is pivotally mounted on casing 13 at 51 and which has a pointed end 52 extending from casing 13 and cooperating with a stationary scale 53. Lever 50 has a pin 58a pivoted on it. Screw 58 passes through pin 58a and through a stationary support 59 and has screw threaded engagement therewith. Screw 58 thus provides means whereby lever 50, and the parts actuated thereby, can be moved manually to a selected position and held in that selected position. That end 54 of lever 50 which is within casing 13 bears upon a collar 55 through which shaft 17 passes freely. Collar 55 has secured to it one end of a spring 56, the opposite end of which bears on a collar 57 rigidly mounted on shaft 17.

By rocking lever 50 about its pivot 51, collar 55 and the end of spring 56 attached to it are moved to a selected, adjusted position. The stress which spring 56 exerts on collar 57 and consequently on shaft 17 against the resultant bias of the pressures exerted on shaft 17 by the air within chambers 31, 33, and 32 is thus varied. Sufficient pressure can be exerted by turning lever 50 by hand to overcome the resultant force of these air pressures and to actuate flapper 18 relative to nozzle 19 and thereby effect a variation in the output pressure of the pilot valve as applied to pipe 28. If valve 2 is open, this output pressure is fed to motor 10 and actuates the final control element.

Chamber 33 is a receiver-followup chamber. An increase in the pressure in chamber 33 causes shaft 17 to move in the direction to lift flapper 18 off nozzle 19. This causes a reduction in the pressure. Shaft 17 is moved by the reduced pressure in chamber 32 in the opposite direction to that in which shaft 17 was moved by the increase in pressure in chamber 33. Chamber 32 is a negative balancing chamber. The reduced pressure in chamber 31 causes shaft 17 to move in the same direction as the direction in which shaft 17 is moved by the increased pressure in chamber 33. Chamber 31 is a positive balancing chamber.

Valves 1, 2, 3, and 4 are connected or ganged together by a mechanical connection, generally indicated at 60, so that these valves may be operated to any one of their three positions by a manual actuator 61, such as a valve handle.

Chamber 97 between diaphragm 16 and sealing diaphragm 15A may be connected by means of pipe 98 to a manually operable air-pressure-transmitter (not shown) of any known, commercially available type. Such a transmitter is used to apply an air pressure to shaft 17 and, consequently, provides means for manually operating final control element 10 from a remote place.

*Operation of Fig. 1*

The transfer valves 1, 2, 3, and 4 have three positions to which they may be selectively moved by actuator 61. Fig. 2 shows a table of these positions which the transfer valves 1, 2, 3, and 4 assume as these valves are shifted by actuator 61 so as to transfer the control of the final control element from the automatically actuated means to the manually actuated means. The sequence of operation of these variables is automatic to seal to manual or vice versa.

Fig. 1 shows the device in the automatic position. A process variable air pressure is transmitted from the measuring instrument and the means, which convert the changes sensed by this measuring instrument to a variable air pressure, to the conduit 11 and through the valve 4 to the receiver-followup chamber 33. Variations in the pressure of the air in chamber 33 move shaft 17 axially in one direction or the other and thereby move flapper 18 relative to valve 19 and cause a resulting and opposite change in the output pressure of the pilot valve in pipe 28. The oppositely changed air pressure in pipe 28 is transmitted through valve 2 to the motor 10 for the final control element and, through valve 3, to the negative balancing chamber 32, which opposes the change in pressure of the air in chamber 33 on diaphragm 14A. The air applied to motor 10 is also transmitted through conduit 29, valve 1, conduit 29A, and reset restriction 30 to positive balancing chamber 31. The oppositely changed air pressure in positive balancing chamber 31 gives a reset mode of operation to the controller 12.

If handle 61 is actuated, the valves 1, 2, 3, and 4 assume the position shown in the column headed "Seal" in Fig. 2. The process variable pressure is still applied through valve 4 to receiver-followup chamber 33. However, valve 2 is closed so that the pressure in the motor 10 is locked therein and in conduit 29, valve 1, conduit 29A, reset restriction 30, and positive balancing chamber 31. In fact, the only change between the automatic position and the seal position, in moving in a direction from automatic to manual position, is that valve 2 is closed.

When the device is in the seal position, screw 58 is turned so that the bias exerted by spring 56 on shaft 17 is equal to the resultant bias of the pressures exerted on shaft 17 by the air within chambers 31, 33, and 32. Since the pressures within chambers 31 and 32 cannot change and are equal to each other, the bias exerted by spring 56 is made to equal the pressure exerted by the air within chamber 33 which corresponds to the value of the process variable at that instant. When this is the case, the shift from seal to manual position can be made without changing the pressure applied to the motor which governs the final control valve and, consequently without a "bump" or disturbance to the process under the control of the final control valve because the pressure now applied to the motor 10 for the final control valve is equal to the pressure about to be applied to the motor for the final control valve. Therefore the final control valve does not change its position when the pressure applied to motor 10 is shifted.

Handle 61 is next actuated so that valves 1, 2, 3, and 4 assume the positions shown in the column headed "Manual" in Fig. 2. Valve 4 is moved so that communication between pipe 11 and chamber 33 is cut off while communication between chamber 33 and pipe 28 is opened. Since valve 2 is also opened the pressure in pipe 28 is applied to motor 10. Valves 1 and 3 are also moved so that chambers 31 and 32 are vented to atmosphere. Movement of the handle portion of lever 50 moves shaft 17 and flapper 18, causing change in the output pressure of the pilot valve in the pipe 28 and consequently actuating motor 10 in accordance with the dictates of the operator of the handle.

Fig. 3

Fig. 3 shows apparatus connected up in substantially the same circuit arrangements as the device of Fig. 1. The manual actuator, however, instead of being a simple lever 50 is an air-operated pilot valve or relay, generally indicated at 70. Pilot valve 70 has a rigid casing 71 in which is mounted a handle shown as a screw 72 bearing at its inner end against a spring 73 which bears against the free or movable end of lever 74. Lever 74 is mounted on casing 71 by a pair of cross spring pivots 75 and 76 and carries at its free end an extension 77 which hooks under or contacts a flapper 78 pivoted on the casing 71 at 79. Flapper 78 is biased by spring 80 toward engagement with nozzle 82. A filtered air supply F. A. S. is connected by restriction 83 to nozzle pipe 82. Nozzle pipe 82 connects nozzle 82 to a chamber 84 in casing 13 of controller 12. Chamber 84 has one wall thereof formed by diaphragm 16 and another wall thereof formed by a smaller, sealing diaphragm 15. The pressure of the air in set point pressure chamber 84 opposes the pressure of the air in receiver-followup chamber 33. If there is any difference between the pressures in these two chambers, shaft 17 moves and causes the sequence of operation described above in connection with Fig. 1.

Nozzle conduit 82 also connects to a bellows 86 in casing 71. The free or movable end 87 of bellows 86 bears against lever 74.

Operation of Fig. 3

The operation of Fig. 3 is the same as the operation of the device disclosed in Fig. 1 except for the following differences.

In the manual position, screw 72 is actuated by hand, thus causing lever 74 to rock about its pivot 75, 76, thereby moving flapper 78 relative to nozzle 82, thus varying the pressure in set point chamber 84. Variations in the air pressure in nozzle conduit 82 and in set point chamber 84 cause shaft 17 to move, thus actuating the final control element 10 through the pilot valve and the circuit connections described in connection with Fig. 1.

Nozzle conduit 82 also connects to the interior of bellows 86. Variations in the air pressure in nozzle conduit 82 cause the free end 87 of bellows 86 to oppose the movements caused by the adjustment of handle 72 and spring 73.

The sequence of switching operations for changing control of the final control element from automatic through seal to manual or vice versa is as described in connection with Figs. 1 and 2 and need not be repeated here.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In an air-pressure-operated automatically or manully actuated circuit for operating a final control element, means for shifting automatically between automatic or manual operation without disturbing the value of the control air pressure at the time of the shift, said means including, a controller having in it a pressure responsive chamber having a flexible wall, means providing an output air pressure varying in response to movements of said wall, a spring connected to said flexible wall so as to oppose motion thereof in one direction, a handle manually moving said spring so as to vary its position of rest, and a manually operable transfer valve having one part connected between said chamber and said output air pressure on one side and a conduit adapted for connection to said final control element on the other side and operable to connect or to disconnect them and having another part operable to connect said chamber to a pressure representing the instantaneous value of the process variable or to said output air pressure.

2. A fluid-pressure-operated controller mechanism providing a final output fluid pressure for operating a fluid-pressure-operated final control element, including in combination, an automatically operable element operated to set up said output fluid pressure in accordance with a controlled variable, a manually operable pressure regulator operated to set up the same output fluid pressure, and a transfer valve manually operable to connect and to disconnect said output fluid pressure from a conduit adapted for connection to the final control element and to connect said automatically operable element either to a pressure representative of said controlled variable or to the pressure presently applied to said conduit adapted for connection to the final control element.

3. A pressure regulating controller adapted for use with a final control element comprising in combination, means providing a pressure-responsive chamber having a flexible wall, yielding means connected to said wall and adapted to be adjusted to exert a yielding force on said wall in one direction, means providing an output air pressure varying in response to movements of said wall, a transfer valve having one part for connecting said chamber either to a pressure representative of the instantaneous value of the process variable or to said output pressure and having another part for connecting said chamber and said output pressure to or for disconnecting said chamber and said output pressure from a conduit adapted for connection to the final control element, and means operable to actuate said transfer valve to a first position to cause said parts to connect said process variable pressure to said chamber and operable to a second position to cause said parts to connect said chamber and said output pressure to said conduit adapted for connection to final control element.

4. A pneumatically operated control for automatically or manually regulating an action or condition, said control including, piping connections adapted for communication with a supply of compressed air, a manually operable pressure regulator having an inlet connected to said supply and having an outlet, an automatically operable pressure regulator adapted to regulate the pressure between said inlet and said outlet in accordance with the variations in a process variable, an output conduit adapted for connection to a final control element for regulating an action or condition either manually under the control of said manual regulator or automatically under the control of said automatic regulator, and a transfer valve comprising a valve body having ports therethrough, each port forming one end of a conduit, a first port 4A being connected to a pressure representative of the instantaneous value of the process variable, a second port 4B being connected to said regulator, a third port 4C being connected to a fourth port 2A and being connected to the outlet of said regulator, and a fifth port 2B being connected to the output conduit, and an element movably mounted in said valve body and selectively manually adjustable to one of the following three positions: automatic position, in which ports 4A and 4B communicate, port 4C is closed, and ports 2A and 2B communicate; seal position, in which ports 4A and 4B communicate, port 4C is closed, and 2A and 2B are closed; and manual position, in which port 4A is closed, ports 4B and 4C communicate, and ports 2A and 2B communicate.

5. In an air-pressure-operated automatically or manually actuated circuit for operating a final control element, means for shifting automatically between automatic or manual operation without disturbing the value of the control air pressure at the time of the shift, said means including, a controller having separate interacting pressure-responsive chambers therein, each of said chambers having a flexible wall, one of said chambers being a receiver-follow-up chamber, another of said chambers being a negative balancing chamber adapted to oppose the movements of said receiver-follow-up chamber, and another of said chambers being a positive balancing chamber adapted to reenforce the movements of said receiver-follow-up chamber, means providing an output pressure varying in response to the movements of said walls, a spring connected to said movable walls and adapted to yieldingly oppose movement of said walls in one direction, a manually operable handle connected to said spring and movable to adjust the bias of said spring on said walls, and a manually operable transfer valve having three positions and four parts, said positions including: automatic position, in which part 1 connects a conduit adapted for connection to the final control element to said positive balancing chamber, part 2 connects said conduit adapted for connection to the final control element to part 3 and to said output pressure, part 3 connects said conduit adapted for connection to the final control element to said negative balancing chamber through part 2 and to said output pressure, part 4 connects said receiver-follow-up chamber to a pressure representing the instantaneous value of the process variable to which the circuit responds, and part 4 disconnects said receiver-follow-up chamber from part 2 and from said output pressure and from said conduit adapted for connection to the final control element; seal position, in which part 1 connects said conduit adapted for connection to the final control element to said positive balancing chamber, part 2 disconnects said conduit adapted for connection to the final control element from part 3 from said output pressure and from part 4, part 3 connects part 2 and said output pressure to said negative balancing chamber, and part 4 connects the process variable pressure to said receiver-follow-up chamber; and manual position, in which part 1 disconnects said positive balancing chamber from said conduit adapted for connection to the final control element and connects said positive balancing chamber to atmosphere, part 2 connects said conduit adapted for connection to the final control element to parts 3 and 4 and to said output pressure, part 3 disconnects said negative balancing chamber from parts 2 and 4 and from said output pressure and connects said negative balancing chamber to atmosphere, and part 4 disconnects the process variable chamber from said receiver-follow-up chamber and connects said receiver-follow-up chamber to said conduit adapted for connection to the final control element through part 2 and to said output pressure.

6. A circuit according to claim 5 in which said controller has a set point chamber opposing the movements of the flexible wall of said receiver-follow-up chamber, and in which a manually-operable air-pressure-transmitter is connected to said set point chamber and manually operable to provide a pressure in said set point chamber representing that value of the process variable which it is desired that said controller maintain.

7. A balanceable control system for controlling the magnitude of a condition at a predetermined value representing a preselected control point, said system including in combination, means operable in response to changes in the magnitude of said condition to produce a control signal, automatically actuated means responsive to said control signal operable to produce an output signal, manually actuated means connected to and manually operable to actuate said automatically actuated means and to override the automatic operation thereof to produce said output signal in response to manual actuation, and manually operated control-transferring means operable to connect said automatically actuated means to said control signal or to disconnect it therefrom and to connect said automatically actuated means to said output signal or to disconnect it therefrom, the connections to said control signal being in the reverse condition to the connections to said output signal.

8. Air powered apparatus for operating an industrial process, including, a controller having a receiver-follow-up chamber, one wall of which is movable in response to the pressure of the air in said chamber and having a valve actuated by the movement of said wall to vary an output pressure from a supply of air under pressure, a spring biasing said valve against movement in one direction from a preselected position, a handle manually movable to actuate said valve by means of said spring and thereby to vary said output pressure regardless of the pressure in said chamber, and a manually operable control-transferring valve operable to connect said chamber to an air pressure responsive to the condition to be controlled and to disconnect said chamber from said outlet pressure or vice versa.

References Cited in the file of this patent

UNITED STATES PATENTS

| | | |
|---|---|---|
| 2,202,286 | Gorrie | May 28, 1940 |
| 2,202,485 | Fitch | May 28, 1940 |
| 2,637,342 | Shannon | May 5, 1953 |
| 2,701,576 | Higgins | Feb. 8, 1955 |
| 2,714,894 | Jewett | Aug. 9, 1955 |